US010646925B2

(12) United States Patent
Nagel

(10) Patent No.: US 10,646,925 B2
(45) Date of Patent: May 12, 2020

(54) CUTTING TOOL

(71) Applicant: Hartmetall-Werkzeugfabrik Paul Horn GmbH, Tuebingen (DE)

(72) Inventor: Rudolf J. Nagel, Neuhausen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 16/122,071

(22) Filed: Sep. 5, 2018

(65) Prior Publication Data

US 2019/0001418 A1 Jan. 3, 2019

Related U.S. Application Data

(63) Continuation of application No. PCT/EP2017/052038, filed on Jan. 31, 2017.

(30) Foreign Application Priority Data

Mar. 22, 2016 (DE) .................. 10 2016 105 354

(51) Int. Cl.
*B23B 27/16* (2006.01)
*B23B 27/00* (2006.01)
(Continued)

(52) U.S. Cl.
CPC .......... *B23B 27/007* (2013.01); *B23B 31/005* (2013.01); *B23B 31/1075* (2013.01);
(Continued)

(58) Field of Classification Search
CPC ............ B23B 2240/08; B23B 2240/16; B23B 2240/28; B23B 27/007; B23B 31/10766;
(Continued)

(56) References Cited

U.S. PATENT DOCUMENTS 1,522,587 A * 1/1925 Hallstrom ............. B23B 27/007
407/101
1,958,817 A * 5/1934 Gase ................... B23B 31/1075
279/83
(Continued)

FOREIGN PATENT DOCUMENTS

CN 2276849 Y 3/1998
CN 1966191 A 5/2007
(Continued)

OTHER PUBLICATIONS

International Preliminary Report on Patentability for International Application No. PCT/EP2017/052038, dated Oct. 4, 2018.
(Continued)

*Primary Examiner* — Sara Addisu
(74) *Attorney, Agent, or Firm* — Jason H. Vick; Sheridan Ross, PC

(57) ABSTRACT

A tool includes a cutting insert with a shank, which extends along a cutting insert longitudinal axis, and with at least one cutting edge, wherein at least a part of the cutting insert is a first material and further includes a tool holder which extends along a holder longitudinal axis and includes on an end-face end a cutting insert receptacle for receiving the cutting insert shank, wherein the cutting insert receptacle is a cup-shaped recess. The tool further includes an attachment element which is connected to the cutting insert and extends in a circumferential direction around the cutting insert shank, wherein at least a part of the attachment element is a second, different material. The tool also includes a fastening element for fastening the cutting insert on the tool holder, wherein, in a mounted state, the fastening element contacts the attachment element to fasten the cutting insert on the tool holder.

18 Claims, 4 Drawing Sheets

(51) Int. Cl.
  *B23B 31/00* (2006.01)
  *B23B 31/107* (2006.01)
  *B23B 51/02* (2006.01)

(52) U.S. Cl.
  CPC .......... *B23B 31/1076* (2013.01); *B23B 51/02* (2013.01); *B23B 2240/08* (2013.01); *B23B 2240/16* (2013.01); *B23B 2240/28* (2013.01); *B23B 2251/02* (2013.01)

(58) Field of Classification Search
  CPC ... B23B 51/02; B23B 2251/02; B23B 31/005; B23B 31/1075
  See application file for complete search history.

(56) References Cited

U.S. PATENT DOCUMENTS

| | | | | |
|---|---|---|---|---|
| 2,039,855 A * | 5/1936 | Stone | ............... | B23B 31/1075 279/79 |
| 2,533,179 A * | 12/1950 | Redinger | ............ | B23B 31/1075 279/83 |
| 2,959,991 A * | 11/1960 | Nixon | ............... | B23B 29/0341 408/146 |
| 3,053,118 A * | 9/1962 | Lavallee | ............... | B23B 31/006 76/108.1 |
| 3,507,508 A * | 4/1970 | Andrews | ............ | B23B 31/1075 279/83 |
| 3,691,883 A * | 9/1972 | Ingram | ............... | B23B 23/00 82/152 |
| 3,841,646 A * | 10/1974 | Bennett | ............... | B23B 29/20 279/14 |
| 3,884,120 A * | 5/1975 | Diferdinando | ...... | B23B 31/1075 409/234 |
| 3,912,413 A * | 10/1975 | Werther | ............... | B23B 27/007 408/143 |
| 3,975,031 A * | 8/1976 | Bennett | ............... | B23B 29/20 279/14 |
| 4,514,117 A * | 4/1985 | Scott | ............... | B23B 31/1075 279/77 |
| 4,579,488 A * | 4/1986 | Griffin | ............... | B23B 27/007 408/59 |
| 4,799,838 A * | 1/1989 | Kubo | ............... | B23B 31/028 279/156 |
| 4,896,892 A | 1/1990 | Andrews | | |
| 4,958,966 A * | 9/1990 | Andrews | ............ | B23B 31/1075 279/143 |
| 4,971,491 A * | 11/1990 | Cook | ............... | B23B 31/006 408/1 BD |
| 5,048,375 A * | 9/1991 | Kobayashi | ............ | B23B 27/00 279/103 |
| 5,074,025 A * | 12/1991 | Willard, III | ............ | B23B 31/005 279/103 |
| 5,311,654 A * | 5/1994 | Cook | ............... | B23B 31/00 29/447 |
| 5,620,286 A * | 4/1997 | Youden | ............... | B23Q 17/2233 409/157 |
| 5,716,056 A | 2/1998 | Bokram | | |
| 5,873,682 A * | 2/1999 | Tripsa | ............... | B23B 29/046 407/101 |
| 7,134,812 B2 | 11/2006 | Beckington | | |
| 7,192,226 B2 * | 3/2007 | Unsworth | ............ | B23B 31/1179 279/145 |
| 7,802,948 B1 * | 9/2010 | Bastiaans | ............ | B23B 31/1075 279/105.1 |
| 8,322,952 B2 | 12/2012 | Tugend et al. | | |
| 8,534,963 B2 * | 9/2013 | Luik | ............... | B23C 3/28 279/83 |
| 8,573,901 B2 * | 11/2013 | de Souza Filho | ........ | B23B 1/00 407/107 |
| 8,813,617 B2 | 8/2014 | Hecht | | |
| 8,956,091 B2 * | 2/2015 | Nonaka | ............... | B23B 31/11 408/233 |
| 9,505,059 B2 * | 11/2016 | Chen | ............... | B23B 29/046 |
| 9,776,311 B2 * | 10/2017 | Nye | ............... | B25B 27/18 |
| 2003/0210963 A1 * | 11/2003 | Kakai | ............... | B23B 31/008 408/231 |
| 2004/0042865 A1 | 3/2004 | Oettle | | |
| 2005/0220552 A1 | 10/2005 | Oettle | | |
| 2006/0251483 A1 * | 11/2006 | Song | ............... | B23B 31/008 408/239 R |
| 2007/0077132 A1 * | 4/2007 | Beckington | ............ | B23B 31/02 408/61 |
| 2007/0248421 A1 * | 10/2007 | Kakai | ............... | B23B 31/1107 407/34 |
| 2008/0179839 A1 * | 7/2008 | Walters | ............... | B23B 31/008 279/51 |
| 2010/0322722 A1 * | 12/2010 | Lin | ............... | B23B 27/007 407/11 |
| 2011/0008114 A1 * | 1/2011 | Wang | ............... | B23B 29/24 407/44 |
| 2011/0200402 A1 | 8/2011 | Hecht | | |
| 2011/0318121 A1 * | 12/2011 | Eriksson | ............... | B23B 31/005 407/102 |
| 2012/0009027 A1 * | 1/2012 | Sharivker | ............... | B23B 31/11 407/42 |
| 2012/0148353 A1 | 6/2012 | Guy | | |
| 2013/0230361 A1 * | 9/2013 | Stagge | ............... | B23B 31/005 409/234 |
| 2014/0099171 A1 * | 4/2014 | Gosselin | ............... | B23B 31/006 409/234 |
| 2015/0231708 A1 * | 8/2015 | McCormick | ............ | B23B 31/08 279/143 |
| 2015/0367423 A1 * | 12/2015 | Voss | ............... | B23B 31/1179 279/20 |
| 2016/0199918 A1 * | 7/2016 | Langbein | ............... | B23B 31/02 408/143 |
| 2016/0236282 A1 * | 8/2016 | Kitagawa | ............... | B23B 27/10 |
| 2016/0311037 A1 * | 10/2016 | Studer | ............... | B23B 51/108 |
| 2018/0369976 A1 * | 12/2018 | Gosselin | ............... | B23B 29/04 |

FOREIGN PATENT DOCUMENTS

| | | | | |
|---|---|---|---|---|
| CN | 101010162 A | 8/2007 | | |
| CN | 102463357 A | 5/2012 | | |
| CN | 102753287 A | 10/2012 | | |
| CN | 202539602 U | 11/2012 | | |
| CN | 203197287 U | 2/2013 | | |
| CN | 103028747 A | 4/2013 | | |
| CN | 204818117 U | 12/2015 | | |
| DE | 8902529 U1 | 8/1989 | | |
| DE | 10052016 A1 | 5/2002 | | |
| DE | 102015104057 | 9/2016 | | |
| DE | 102015014583 A1 | 5/2017 | | |
| GB | 2228695 B | 7/1992 | | |
| GB | 2499117 A * | 8/2013 | ............... | B25G 3/04 |
| JP | 11151608 A * | 6/1999 | ............ | B23B 31/005 |
| JP | 2001205514 A * | 7/2001 | ............ | B23B 31/005 |
| JP | 2001219320 A * | 8/2001 | ............ | B23B 31/005 |
| RU | 2032499 C1 | 4/1995 | | |
| RU | 2541214 C2 | 2/2015 | | |
| SU | 1514497 | 10/1989 | | |
| WO | WO 2004/020130 | 3/2004 | | |

OTHER PUBLICATIONS

International Search Report for International Application No. PCT/EP2017/052038, dated May 17, 2017.
Written Opinion for International Application No. PCT/EP2017/052038, dated May 17, 2017.
Office Action for corresponding European Patent Application No. 17702368.6, dated Jun. 18, 2019.
Decision to Grant a Patent for an Invention for corresponding Russian Patent Application No. 2018133296/02(054638), dated Jun. 20, 2019.
Office Action for corresponding Chinese Patent Application No. 201780013837.1, dated Jul. 23, 2019.

* cited by examiner

CUTTING TOOL

CROSS REFERENCES TO RELATED APPLICATIONS

This application is a continuation of international patent application PCT/EP2017/052038, filed on Jan. 31, 2017 designating the U.S., which international patent application has been published in German language and claims priority from German patent application DE 10 2016 105 354.6, filed on Mar. 22, 2016. The entire contents of these priority applications are incorporated herein by reference.

BACKGROUND OF THE INVENTION

The present disclosure relates to a tool for machining a workpiece which is preferably designed as an internal turning tool and is suitable for machining inside surfaces of bores, for example, for recess turning of circumferential grooves into the bore wall, for precision turning of the bore wall, for thread turning in a bore wall or the like.

An exemplary tool of this type is disclosed, for example, in DE 89 02 529 U1 and has already been marketed by the Applicant for years under the name "Horn Supermini®". Said tool system offers the possibility, depending on the application, of fastening the most varied types of cutting inserts in the tool holder. The tool system is suitable both for grooving and for external turning of bores and for axial grooving and thread turning. On account of the geometry and size of the cutting insert and of the tool holder, the named tool system is suitable, in particular, for machining small bores, for diameters as small as 0.2 mm.

The named tool or tool system is distinguished, in particular, in that the cutting insert comprises a clamping portion which is insertable into the cutting insert receptacle in the tool holder and is clampable on the tool holder by means of a clamping screw. In the case of the solution known up to now, the clamping screw is inserted into the tool holder from above, perpendicularly to the longitudinal axis of the holder and of the cutting insert. In the mounted state of the tool, the clamping screw presses from above directly onto the cutting insert and fixes it, in this case, in the cutting insert receptacle of the tool holder. A notch, in which the clamping screw engages or pushes, is provided for this purpose on the top surface of the cutting insert shank. Releasing the cutting insert from the tool holder can be performed in a very simple manner by releasing the clamping screw such that replacing the cutting insert is relatively simple and can be done in a short time.

In contrast to "conventional" turning tools, the cutting insert receptacle provided in the tool holder in the case of the tool of the above-named type is realized as a type of blind hole or cup-shaped recess. The cutting insert is therefore not clamped between two expandable clamping fingers as in the case of many turning tools for groove turning but is inserted into a recess and fixed on the tool holder by means of the above-named clamping screw. In the mounted state of the tool, the clamping portion of the cutting insert is consequently surrounded, preferably fully, transversely with respect to the longitudinal direction thereof along the entire circumference of the tool holder.

Although the tool disclosed in DE 89 02 529 U1 has been proven in practice, it has been possible over the years to ascertain a few disadvantages of said tool system. In the case of the solution known up to now, the axial abutment between the cutting insert and the tool holder is effected as a result of the holder-side end of the cutting insert shank abutting against an axial contact surface on the tool holder, which contact surface is aligned orthogonally with respect to the longitudinal direction of the cutting insert or tool holder. The distance between the axial abutment and the cutting edge arranged on the opposite end of the cutting insert is consequently relative large. The clamping screw, which presses onto the cutting insert shank orthogonally with respect to the longitudinal direction of the cutting insert or tool holder, contributes to the fact that the cutting insert is stressed by "buckling" during the machining of the workpiece. Apart from this, the clamping screw compresses the cutting insert somewhat within the fitting tolerance. Since, when the clamping screw is tightened, the cutting insert can be deformed elastically, this can result in deviations in the center height, which has a negative effect on the precision of the tool. The notch provided in the cutting insert shank, in which the clamping screw engages, additionally reduces the stability and strength of the cutting insert shank.

SUMMARY OF THE DISCLOSURE

It is thus an object to provide a cutting tool of the type named in the introduction which is improved with respect to the stability, strength and precision of the tool.

According to a first aspect, a tool for machining a workpiece is presented, which comprises:

- a cutting insert with a shank, which extends along a cutting insert longitudinal axis, and with at least one cutting edge, wherein at least a part of the cutting insert is made of a first material;
- a tool holder which extends along a holder longitudinal axis and comprises on an end-face end a cutting insert receptacle which is configured to receive the cutting insert shank, wherein the cutting insert receptacle is designed as a cup-shaped recess in the tool holder;
- an attachment element which extends in a circumferential direction around the cutting insert shank, wherein at least a part of the attachment element is made of a second material which differs from the first material, and wherein the attachment element is shrunk onto the cutting insert shank or is soldered or welded to said cutting insert shank; and
- a fastening element which is configured to fasten the cutting insert on the tool holder, wherein the fastening element contacts the attachment element in order to fasten the cutting insert on the tool holder.

According to a second aspect, a tool for machining a workpiece is presented, which comprises:

- a cutting insert with a shank, which extends along a cutting insert longitudinal axis, and with at least one cutting edge, wherein at least a part of the cutting insert is made of a first material;
- a tool holder which is fixedly connected to the cutting insert and extends along a holder longitudinal axis and comprises on an end-face end a cutting insert receptacle which is configured to receive the cutting insert shank, wherein the cutting insert receptacle is designed as a cup-shaped recess in the tool holder;
- an attachment element which extends in a circumferential direction around the cutting insert shank, wherein at least a part of the attachment element is made of a second material which differs from the first material, and wherein the attachment element comprises at least one coolant bore which is realized as a through hole; and
- a fastening element which is configured to fasten the cutting insert on the tool holder, wherein the fastening element contacts the attachment element in order to fasten the cutting insert on the tool holder.

The provision of an extra attachment element which is fitted onto the cutting insert shank, is fixedly connected to said cutting insert shank and surrounds the cutting insert shank, preferably fully, in the circumferential direction, has the following advantages: The abutment between the cutting insert and the tool holder is now able to be effected by means of the attachment element. Since said attachment element, compared to the rear, holder-side end of the cutting insert shank against which the axial abutment has been effected up to now, is able to be arranged closer to the cutting edge of the cutting insert, the cutting insert is no longer as strongly stressed by "buckling" compared to the solution disclosed in DE 89 02 529 U1. In addition, a notch no longer has to be provided in the cutting insert shank as the fastening element cooperates with the attachment element. The cutting insert shank itself is consequently no longer weakened. In the case of the solution known up to now, it has additionally hardly been possible to provide an exact fit between the cutting insert shank and the cutting insert receptacle provided in the tool holder since sufficient fitting tolerance has had to be provided here as otherwise it would not have been possible to insert the cutting insert shank into the cutting insert receptacle or release it from said cutting insert receptacle. Said fit can now also be ensured in a simpler manner by means of the attachment element. Apart from this, the attachment element and the size thereof can be adapted in a variable manner to the size or length of the cutting insert. Overall, the precision, stability and strength of the tool can consequently be improved.

The attachment element is preferably designed in a substantially ring-shaped manner. The term "in a substantially ring-shaped manner" is to be understood in the present case as a form which corresponds as a whole at least approximately to the form of a ring but in portions can deviate from the exact form of a ring. The attachment element surrounds the cutting insert shank, preferably fully, in the circumferential direction.

The attachment element is preferably made of steel. The tool holder is also preferably made of steel. The cutting insert, in contrast, is preferably made of hard metal.

The attachment element, as already mentioned, is fixedly connected to the cutting insert shank. According to a refinement, the attachment element is shrunk onto the cutting insert shank. As an alternative to this, it can be soldered or welded to said cutting insert shank.

According to a further refinement, the cutting insert shank and the cutting insert receptacle of the tool have a circular cross section, in contrast to the drop-shaped cross-sectional form of the cutting insert shank and the cutting insert receptacle disclosed in DE 89 02 529 U1. Accordingly, the attachment element preferably has a substantially circular cross section. Said circular cross section is considerably simpler to produce than the more complexly designed, drop-shaped cross section of the tool disclosed in DE 89 02 529 U1.

According to a refinement, the cutting insert receptacle has a front region for receiving the attachment element and a rear region for receiving the cutting insert shank, wherein the rear region is at a greater distance from the front, end-face end than the front region, and wherein the front region, when measured orthogonally with respect to the holder longitudinal axis, has a greater diameter than the rear region.

In other words, the front region of the cutting insert receptacle therefore lies closer to the front, end-face end than the rear region which lies further inside the tool holder. The front region is additionally designed to be larger as it receives the attachment element which protrudes radially from the cutting insert shank. The rear region of the cutting insert receptacle, in comparison, can be designed so as to be smaller as it only has to be slightly larger than the cutting insert shank. The form of the cutting insert receptacle consequently corresponds approximately to a step bore with a greater diameter initially and a smaller diameter further inside the tool holder.

An axial contact surface, against which the attachment element abuts when the tool is in the mounted state, is preferably arranged in the cutting insert receptacle between the front and the rear regions. Said axial contact surface is aligned transversely, preferably orthogonally with respect to the holder longitudinal axis. The term "transversely" is to be understood in the present case preferably, but not necessarily, as orthogonally. The term "transversely" is consequently to be understood as "non-parallel" and consequently is to include all angles not equal to 0°.

The attachment element, correspondingly thereto, comprises an axial contact surface which corresponds with the axial contact surface arranged in the cutting insert receptacle. The axial contact surface of the attachment element is aligned transversely, preferably orthogonally with respect to the cutting insert longitudinal axis. The axial contact surface of the attachment element is preferably a substantially circular ring-shaped surface.

In contrast to the solution disclosed in DE 89 02 529 U1, the axial abutment for transmitting the forces in the axial direction, that is to say parallel to the holder longitudinal axis or cutting insert longitudinal axis, is effected by means of the attachment element and not by means of the rear, holder-side end of the cutting insert shank.

According to a further refinement, the attachment element comprises an outside circumferential surface which is remote from the cutting insert longitudinal axis and, in the mounted state of the tool, abuts against an inside surface of the cutting insert receptacle, which points to the holder longitudinal axis and is situated in the front region of the cutting insert, wherein the outside circumferential surface of the attachment element and the inside surface of the cutting insert receptacle are each at least partially conical or cylindrical. At least parts of said surfaces therefore lie on a conical or cylindrical lateral surface.

There is consequently therefore a taper planar abutment or a cylinder planar abutment between the attachment element and the tool holder. This serves for radial guiding.

According to a refinement, the attachment element comprises a blind hole or recess which extends in the radial direction and in which the fastening element engages.

The attachment element and consequently also the cutting insert are able to be fixed in an optimum manner as a result of said blind hole or recess. Apart from this, an anti-rotation device is also achieved as a result.

According to a further refinement, the attachment element comprises a groove, which is arranged on a side opposite the blind hole or recess and extends parallel to the cutting insert longitudinal axis. In addition, according to said refinement, the tool preferably comprises an adjusting element which engages in the groove for adjusting the cutting insert. The groove preferably has a V-shaped cross section. The adjusting element is preferably a clamping screw with a conical tip, the term "conical tip" being understood both as a conical and a truncated conical tip.

The V-shaped groove serves, on the one hand, for positioning so that the cutting insert is only able to be installed in the tool holder in one single position. The clamping screw serving as adjusting element secures the cutting insert in said position. The conical tip of the clamping screw corresponds to the V-shaped groove which is provided on the cutting insert shank. Said mechanism, which consists of the V-shaped groove and the conical clamping screw, additionally serves for the precision adjustment of the center height of the cutting edge of the cutting insert. The center height of the cutting edge of the cutting insert can consequently therefore be precision adjusted by means of the clamping screw. Said option for precision adjustment of the center height is in particular advantageous consequently as when the fastening element is tightened for fastening the cutting insert on the tool holder, smaller elastic deformations can occur in the cutting insert shank. It is consequently now possible to compensate for said deformations, which is not the case with comparable systems.

The V-shaped groove is arranged on the attachment element opposite the blind hole or recess in which the fastening element engages for fastening the cutting insert on the tool holder. Said fastening element is preferably also a clamping screw with a conical tip. It presses onto the attachment element in comparison to the adjusting element on the opposite side. The bottom of the blind hole or recess provided on the attachment element is preferably also formed in a conical manner such that it corresponds with the clamping screw which serves as fastening element. When the clamping screw is tightened, the cutting insert is consequently pulled into the tool holder up to the axial stop. As a result, the cutting insert is additionally secured against rotation again.

According to a further refinement, the tool holder comprises a first holder bore with a first thread which corresponds with the clamping screw which serves as fastening element. In addition, the tool holder according to said refinement also comprises a second holder bore with a second thread which corresponds with the clamping screw which serves as adjusting element. The first and the second holder bores each extend in the radial direction, that is to say orthogonally with respect to the holder longitudinal axis and are realized as through-bores.

The center axes of the two holder bores preferably extend parallel to one another and are offset with respect to one another along the holder longitudinal axis for further increasing the stability.

In a further refinement, the attachment element comprises at least one coolant bore which is realized as a through hole.

The size, form and alignment of said at least one coolant bore can be adapted to the form and alignment of the cutting edge. As a result of integrating the coolant bore in the attachment element, the coolant can be run relatively simply into the region of the cutting edge without coolant bores having to be provided for this purpose on the end-face end of the tool holder, which would have a negative effect on the stability of the tool holder in said region. Apart from this, integrating the coolant bores in the attachment element provides a space-saving arrangement, which is advantageous in particular with reference to the required very small overall dimensions of the tool.

The above-mentioned features and those yet to be explained in the following text are usable not only in the combination given in each case but also in other combinations or on their own, without departing from the spirit and scope of the present disclosure.

DESCRIPTION OF PREFERRED EMBODIMENTS

Figure 1:
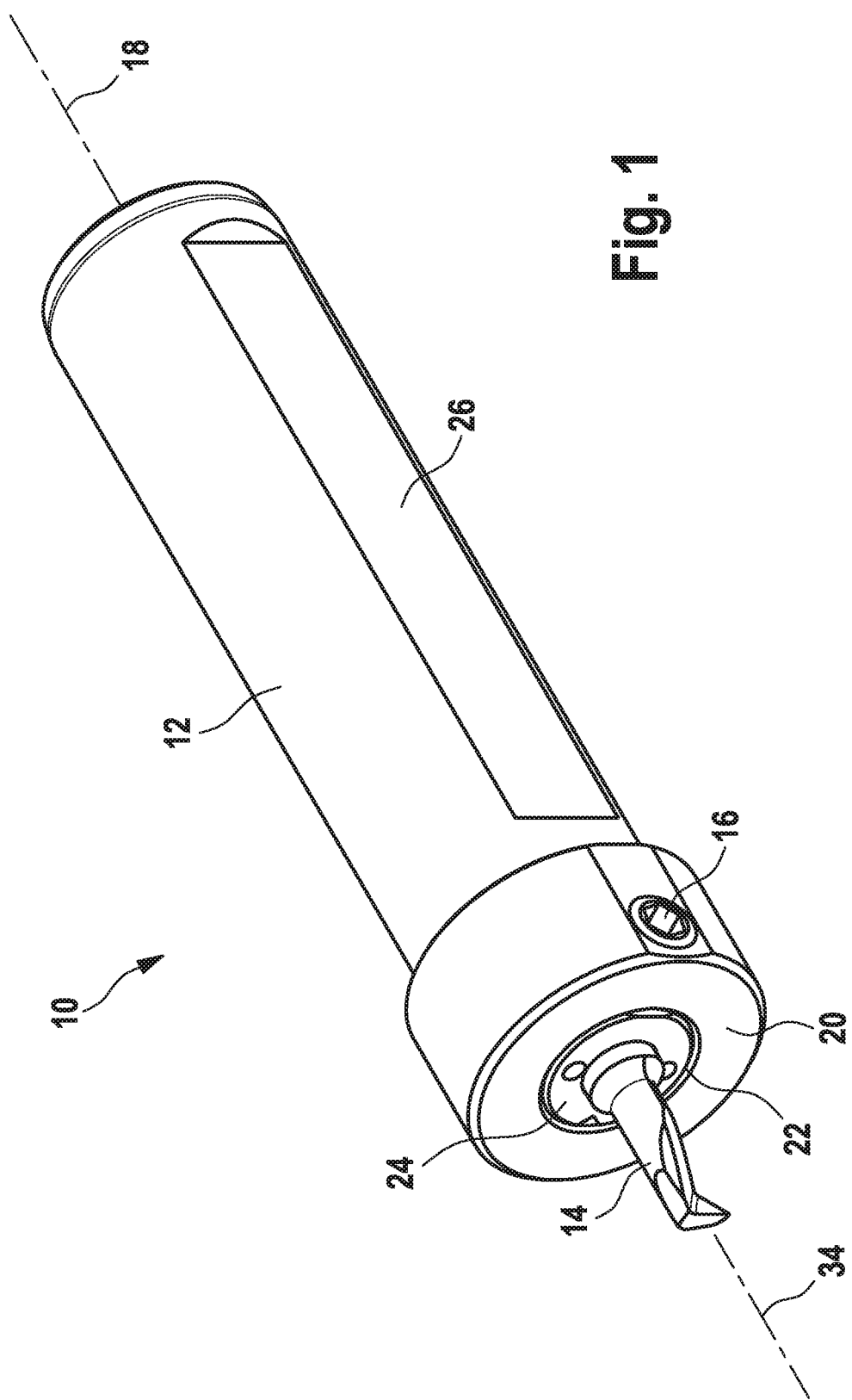
FIG. 1 shows a perspective view of an exemplary embodiment of the tool.
Figure 2:
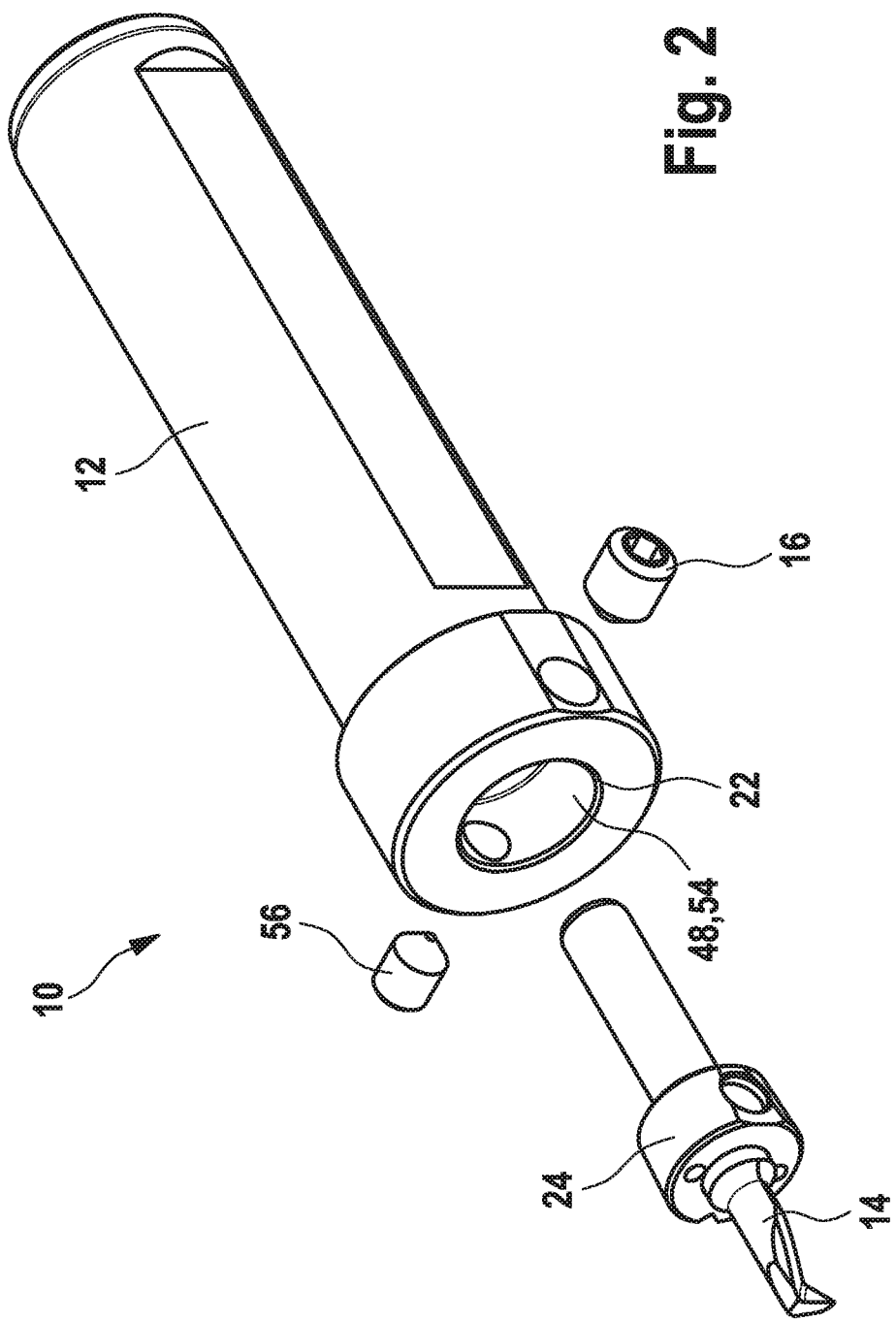
FIG. 2 shows an exploded representation of the exemplary embodiment of the tool shown in FIG. 1.
Figure 3:
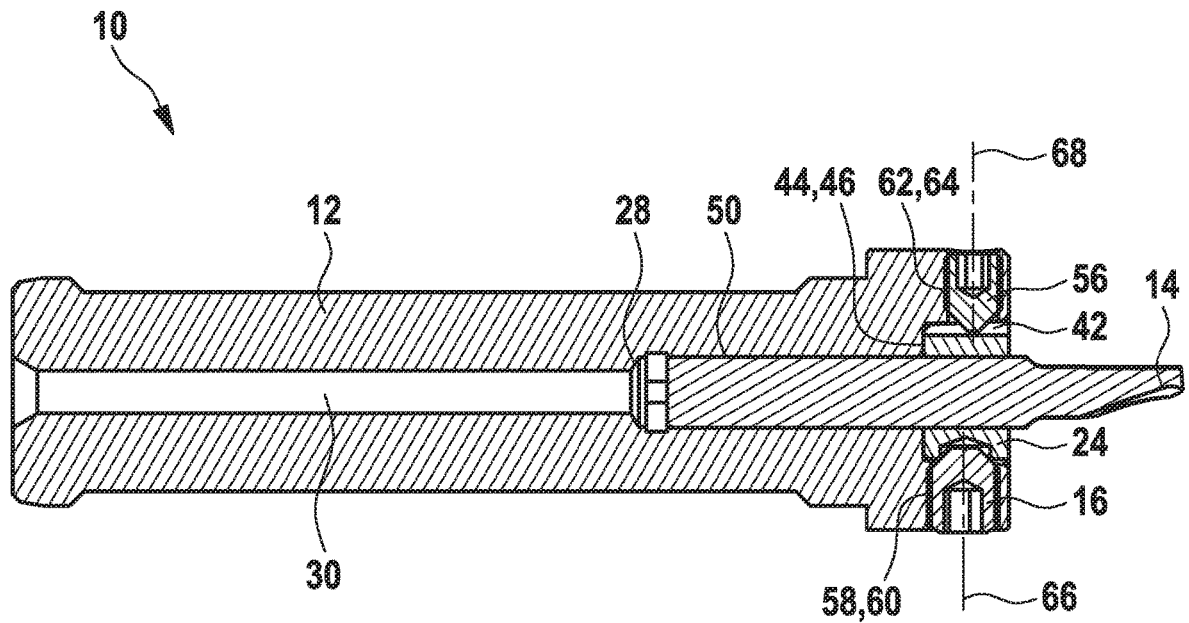
FIG. 3 shows a longitudinal section of the exemplary embodiment of the tool shown in FIG. 1.
Figure 4:
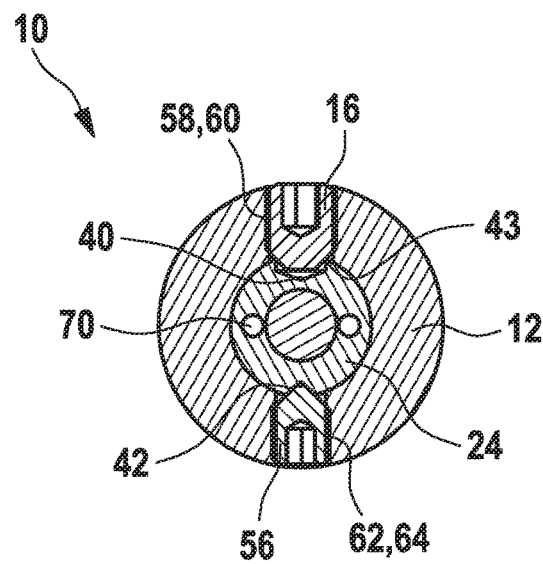
FIG. 4 shows a cross section of the exemplary embodiment of the tool shown in FIG. 1.

FIGS. 1-4 show a perspective view (FIG. 1), an exploded representation (FIG. 2), a longitudinal section (FIG. 3) and a cross section (FIG. 4) of an exemplary embodiment of the tool. The tool is designated as a whole therein by way of the reference numeral 10. FIGS. 1, 3 and 4 show the tool 10 in its mounted state.

The tool 10 comprises a tool holder 12 and a replaceable cutting insert 14 which is fastenable on the tool holder 12, among other things, by means of a fastening means 16.

The tool holder 12 is preferably made of steel. The cutting insert 14, in contrast, is preferably made of hard metal.

The tool holder 12 extends substantially along a holder longitudinal axis 18 and comprises a cutting insert receptacle 22 on an end-face end 20. Although said receptacle 22 is designated in the present case as "a cutting insert receptacle" for reasons of simplicity, it serves not only for receiving the cutting insert 14 but also for receiving an attachment element 24 which is fitted onto the cutting insert 14 and is fixedly connected thereto. In its rear region, the tool holder 12 comprises a holder shank 26 with a clamping portion, by means of which the tool holder 12 can be fastened on a power tool.

The cutting insert receptacle 22 is admitted into the tool holder 12 in the form of a cup-shaped recess. Said cup-shaped recess forms a type of blind hole or step bore in the tool holder 12. The term "cup-shaped recess" is used in the present case to clarify that the recess forming the cutting insert receptacle 22 is a hollow in the tool holder 12 which comprises a closed circumferential wall which extends around with reference to the holder longitudinal axis 18 and is open toward the end side 20 of the tool holder 12.

In other words, the cup-shaped recess is admitted into the tool holder 12 and is surrounded all around the holder longitudinal axis 18 by the tool holder 12. The term "cup-shaped recess", however, is not to be restricted to any special cross-sectional form. The cross section of said recess can be formed in an extremely complex manner and does not have to be circular, as in the present case. The cup-shaped recess which serves as the cutting insert receptacle 22 does have a bottom 28 (see FIG. 3) in the interior of the tool holder 12. Said bottom 28, however, does not have to be a closed wall. As can be seen from the longitudinal section in FIG. 3, a bore 30, which is used, for example, for the coolant supply, can also connect to the bottom of the cutting insert receptacle 22.

Figure 5A:
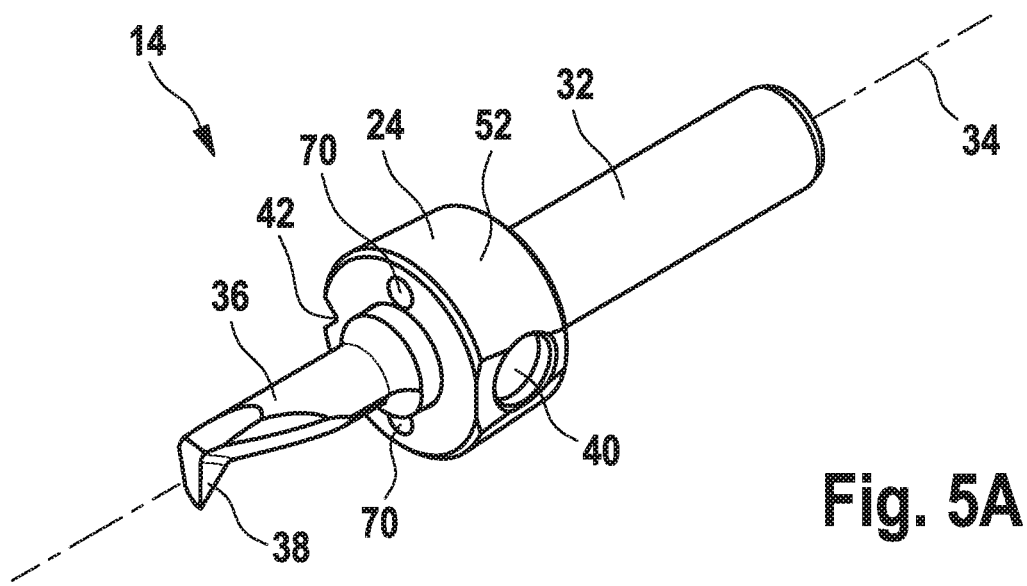
FIGS. 5A-5C show a perspective view and two side views of a cutting insert including attachment element which can be used in the tool.
Figure 5B:
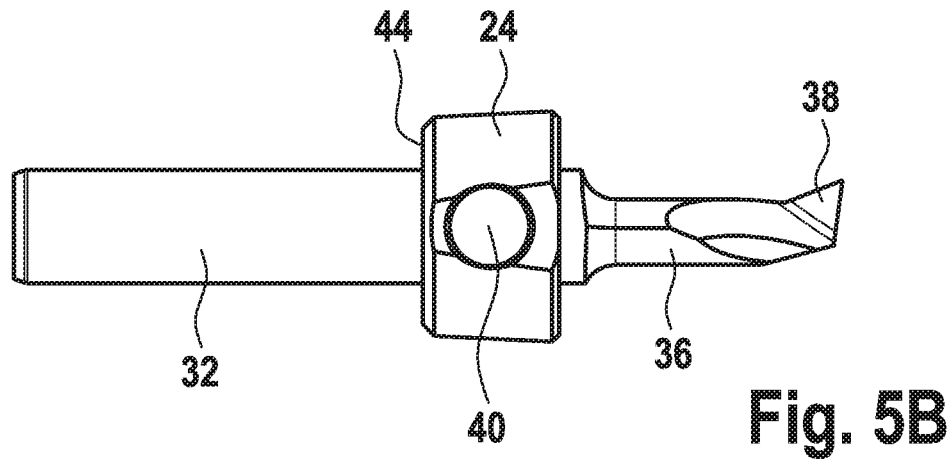
Figure 5C:
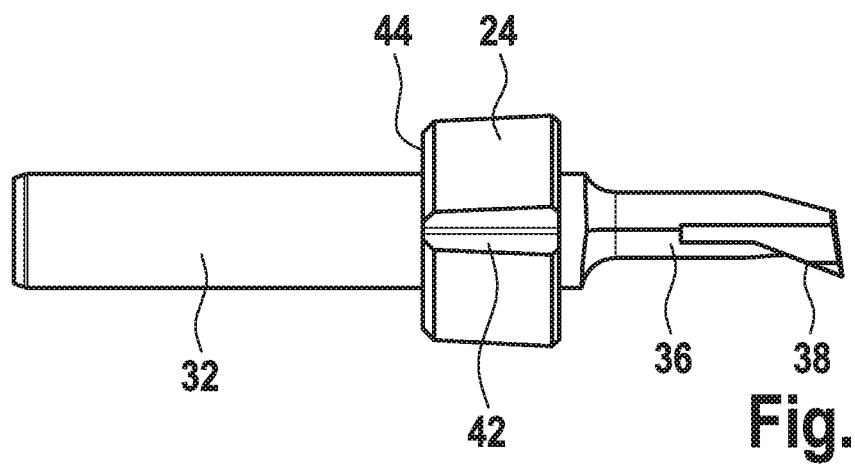

The cutting insert 14, which is shown separately in FIGS. 5A-5C, has a shank 32 which extends substantially along a cutting insert longitudinal axis 34 which, in the mounted state of the tool 10, coincides with the holder longitudinal axis 18. A ground cutting insert head 36, which comprises at least one cutting edge 38, is situated in the front region of the cutting insert. The cutting insert head 36 is preferably connected in one piece to the cutting insert shank 32. In the present exemplary embodiment, said cutting insert head 36 is substantially hook-shaped, the cutting edge 38 being arranged on a bent-off end of the cutting insert head. It is obvious, however, that other forms of the cutting insert head 36 and of the cutting edge 38 arranged thereon are also possible depending on the requirement and the application without departing from the spirit and scope of the present disclosure.

The attachment element 24 is fitted onto the shank 32 of the cutting insert 14 and is fixedly connected to said shank. It is preferably designed as a type of ring which is pulled over the shank 32 and surrounds said shank, preferably fully, in the circumferential direction. The attachment element 24 is preferably made of steel. The attachment element 24 is preferably shrunk onto the cutting insert shank 32. However, it is also equally conceivable for the attachment element 24 to be welded or soldered to the cutting insert shank 32. In the exemplary embodiment shown in this case, the attachment element 24 has a substantially circular ring-shaped cross section, in particular parts of the outside of the attachment element 24 deviating from the exact circular ring form, which is why the form of the attachment element in the present case is described as "substantially circular ring-shaped".

The attachment element 24 comprises a blind hole 40. The fastening element 16 engages in said blind hole 40 in order to fix the attachment element 24 to the cutting insert 14 on the tool holder 12 which is fixedly connected thereto. A recess, which is formed in any way, can also be arranged here in place of a blind hole 40.

On a side located opposite the blind hole 40, the attachment element 24 comprises a groove 42. Said groove 42 extends parallel to the cutting insert longitudinal axis 34. The groove 42 preferably has a V-shaped cross section.

The attachment element 24 serves as a type of connecting piece between the cutting insert 14 and the tool holder 12. In the mounted state of the tool 10, the fastening element 16 engages in the blind hole 40 provided on the attachment element 24. As a result, the attachment element 24 plus the cutting insert 14 fixedly connected thereto is clamped on the holder 12. The fastening element 16 is preferably realized as a clamping screw. In a particularly preferred manner, said clamping screw is a grub screw with a conical tip 44 (see FIG. 4) When the clamping screw 16 is tightened, the cutting insert 14 is consequently pulled into the holder 12, up to the point at which the attachment element 24 strikes against the interior of the tool holder 12.

In the mounted state of the tool 10, the attachment element 24 abuts by way of an axial contact surface 44, which extends transversely, preferably orthogonally with respect to the cutting insert longitudinal axis 34 (see FIGS. 5B and 5C), against a corresponding axial contact surface 46 of the tool holder 12, which extends transversely, preferably orthogonally with respect to the holder longitudinal axis 18 (see FIG. 3). The axial contact surface 44 arranged on the attachment element 24 and also the corresponding axial contact surface 46 arranged in the cutting insert receptacle 22 is in each case a circular ring-shaped surface.

The axial contact surface 46 of the tool holder 12 is arranged between a front region 48 (see FIG. 2) and a rear region 50 (see FIG. 3) in the cutting insert receptacle 22. The front region 48 of the cutting insert receptacle 22 has a larger diameter, measured orthogonally with respect to the holder longitudinal axis 18, when compared to the rear region 50 of the cutting insert receptacle 22. The front region 48 serves for receiving the attachment element 24. The rear region 50 serves, in contrast, for receiving the cutting insert shank 32. The diameter of the front region 48 preferably corresponds substantially to the diameter of the attachment element 24, the diameter of the attachment element 24 being somewhat smaller so that the attachment element 24 is insertable into the front region 48. Likewise, the diameter of the rear region 50 corresponds approximately to the diameter of the cutting insert shank 32, here too the diameter of the cutting insert shank 32 being somewhat smaller so that it is insertable into the rear region 50.

Radial guiding is also effected at least in part by means of the attachment element 24. However, radial guiding is primarily effected by means of the shank 32 of the cutting insert 14 as a result of interaction with the inside surface in the rear region 50 of the cutting insert receptacle 22. The attachment element 24 chiefly serves for axial guiding.

The attachment element 24 comprises an outside circumferential surface 52 (see FIG. 5A) which is remote from the cutting insert longitudinal axis 34 and, in the mounted state of the tool, abuts against an inside surface of the tool holder 12 which points to the holder longitudinal axis 18 and is situated in the front region 48 of the cutting insert receptacle 22. Both the outside circumferential surface 52 and the inside surface 54 are conical or cylindrical surfaces.

As can be seen additionally from FIGS. 2-4, the tool 10 preferably comprises one more clamping screw 56 which is also designed in the present exemplary embodiment as a grub screw with a conical tip. Said clamping screw 56 is designated in the present case in general as an "adjusting element". The adjusting element 56 engages in the V-shaped groove 42 provided on the attachment element 24 for adjusting the cutting insert 14. The V-shaped groove 42 serves, on the one hand, for positioning the cutting insert 14 in the tool holder 12 such that the cutting insert 12 plus attachment element 24 is only able to be fastened in the tool holder 12 in one single position. The interaction between adjusting element 56 and V-shaped groove 42 serves for precision adjusting the center height of the cutting insert 14 or of the cutting edge 38. As smaller deformations can occur in the attachment element 24 or inside the cutting insert 14 when the clamping screw 16 is tightened, it is advantageous to be able to compensate for them by means of the adjusting element 56. It is obvious that said adjusting element 56 also contributes to the clamping of the cutting insert 14 on the tool holder 12, and consequently also to the radial guiding of the cutting insert 14.

As can be seen in particular from FIG. 4, the clamping screw which serves as fastening element 16 is screwed into a first holder bore 58 which has a first thread 60. The clamping screw which serves as adjusting element 56 is screwed into a second holder bore 62 which has a second thread 64. Both holder bores 58, 62 preferably extend orthogonally with respect to the holder longitudinal axis 18 and parallel to one another. Both holder bores 58, 62 are realized as through bores. The first holder bore 58 extends along a first center axis 66. The second holder bore 62 extends along a second center axis 68. Said two center axes are parallel to one another, however are offset to one another along the holder longitudinal axis 18.

Another or multiple coolant bores 70 can be provided in the attachment element 24 (see FIGS. 4 and 5A). They preferably extend parallel to the cutting insert longitudinal axis 24 and are realized as through holes.

Overall, the design of the tool 10 is advantageous for the following reasons: By virtue of the attachment element 24 fitted onto the cutting insert shank 32, the axial abutment 44, 46 can be realized comparatively relatively far forward on the cutting insert 14. In the case of previously disclosed tools of this type, the axial abutment is effected relative far rearward instead, namely normally on the rear, end-face end of the cutting insert shank 32. The tool is consequently stressed comparatively little by "buckling".

In addition, it is not necessary to form a recess in the cutting insert shank 32 as the recess or blind hole 40, in which the fastening element 16 engages, is arranged on the attachment element 24 in the present case.

A further advantage is produced by the possibility of precision adjustment of the center height by means of the adjusting element 56. As a result of said precision adjustment, it is possible to compensate for any elastic deformation which can occur when the fastening element 16 is tightened.

The space-saving integration of the coolant bores 70 into the attachment element 24 is to be valued as a further advantage. Apart from this, the production of the cutting insert 14 with the attachment element 24 shrunk thereon is relatively cost-efficient. The form and size of the attachment element can be adapted individually to the conditions, for example to the form and size of the cutting insert 14.

What is claimed is:

1. A tool for machining a workpiece, comprising:
a cutting insert with a shank, which extends along a cutting insert longitudinal axis, and with at least one cutting edge, wherein at least a part of the cutting insert is made of a first material;
a tool holder which extends along a holder longitudinal axis and comprises on an end-face end a cutting insert receptacle which is configured to receive the cut-ting insert shank, wherein the cutting insert receptacle is designed as a cup-shaped recess in the tool holder;
an attachment element which extends in a circumferential direction around the cutting insert shank, wherein at least a part of the attachment element is made of a second material which differs from the first material, and wherein the attachment element is shrunk onto the cutting insert shank or is soldered or weld-ed to said cutting insert shank; and
a fastening element which is configured to fasten the cutting insert on the tool holder, wherein the fastening element contacts the attachment element in order to fasten the cutting insert on the tool holder,
wherein the cutting insert receptacle has a front region which is configured to receive the attachment element, and a rear region which is configured to receive the cutting insert shank, wherein a first distance from the rear region to the end-face end is larger than a second distance from the front region to the end-face end, and wherein the front region, when measured orthogonally with respect to the holder longitudinal axis, has a larger diameter than the rear region.

2. The tool as claimed in claim 1, wherein each of the cutting insert shank and the cutting insert receptacle have a circular cross section, and the attachment element has a cross section at least a portion of which is circular ring-shaped.

3. The tool as claimed in claim 1, wherein the first material is hard metal and the second material is steel.

4. The tool as claimed in claim 1, wherein an axial contact surface, against which the attachment element abuts, is arranged in the cutting insert receptacle between the front region and the rear region, wherein the axial contact surface is aligned orthogonally with respect to the holder longitudinal axis.

5. The tool as claimed in claim 4, wherein the attachment element comprises an outside circumferential surface which is remote from the cutting insert longitudinal axis and abuts against an inside surface of the cutting insert receptacle, which inside surface is arranged in the front region of the cutting insert receptacle, wherein each of the outside circumferential surface of the attachment element and the inside sur-face of the cutting insert receptacle are at least partially conical or cylindrical.

6. The tool as claimed in claim 1, wherein the attachment element comprises a blind hole or recess which extends in a radial direction.

7. The tool as claimed in claim 6, wherein the attachment element comprises a groove, which is arranged on a side opposite the blind hole or recess, and extends parallel to the cutting insert longitudinal axis.

8. The tool as claimed in claim 7, wherein the tool comprises an adjusting element which engages in the groove for adjusting the cutting insert with respect to the tool holder.

9. The tool as claimed in claim 8, wherein the groove has a V-shaped cross section and the adjusting element comprises a clamping screw with a conical tip.

10. The tool as claimed in claim 1, wherein the fastening element comprises a clamping screw with a conical tip.

11. The tool as claimed in claim 1, wherein the attachment element comprises a blind hole or recess which extends in a radial direction, wherein the attachment element comprises a groove having has a V-shaped cross section, wherein the groove is arranged on a side opposite the blind hole or recess and extends parallel to the cutting insert longitudinal axis, wherein the tool comprises an adjusting element which engages in the groove, wherein the fastening element comprises a first clamping screw with a conical tip, and wherein the adjusting element comprises a second clamping screw with a conical tip, wherein the tool holder comprises a first holder bore with a first thread which corresponds with the first clamping screw, and wherein the tool holder comprises a second holder bore with a second thread which corresponds with the second clamping screw, and wherein each of the first and the second holder bores extends orthogonally with respect to the holder longitudinal axis in a radial direction and is realized as a through-bore.

12. The tool as claimed in claim 11, wherein the first holder bore comprises a first center axis and the second holder bore comprises a second center axis, wherein the first and the second center axes extend parallel to one another and are offset with respect to one another along the holder longitudinal axis.

13. The tool as claimed in claim 1, wherein the attachment element comprises at least one coolant bore which is realized as a through hole.

14. A tool for machining a workpiece, comprising:
a cutting insert with a shank, which extends along a cutting insert longitudinal axis, and with at least one cutting edge, wherein at least a part of the cutting insert is made of a first material;
a tool holder which is fixedly connected to the cutting insert and extends along a holder longitudinal axis and comprises on an end-face end a cutting insert receptacle which is configured to receive the cutting insert shank, wherein the cut-ting insert receptacle is designed as a cup-shaped recess in the tool holder;
an attachment element which extends in a circumferential direction around the cutting insert shank, wherein at least a part of the attachment element is made of a second material which differs from the first material, and wherein the attachment element comprises at least one coolant bore which is realized as a through hole; and a fastening element which is configured to fasten the cutting insert on the tool holder, wherein the fastening element contacts the attachment element in order to fasten the cutting insert on the tool holder;

wherein the cutting insert receptacle has a front region which is configured to receive the attachment element, and a rear region which is configured to receive the cutting insert shank, wherein a first distance from the rear region to the end-face end is larger than a second distance from the front region to the end-face end, and wherein the front region, when measured orthogonally with respect to the holder longitudinal axis, has a larger diameter than the rear region.

15. The tool as claimed in claim 14, wherein each of the cutting insert shank and the cutting insert receptacle have a circular cross section and the attachment element has a cross section at least a portion of which is circular ring-shaped.

16. The tool as claimed in claim 14, wherein the first material is hard metal and the second material is steel.

17. The tool as claimed in claim 14, wherein an axial contact surface, against which the attachment element abuts, is arranged in the cutting insert receptacle between the front region and the rear region, wherein the axial contact surface is aligned orthogonally with respect to the holder longitudinal axis.

18. The tool as claimed in claim 14, wherein the attachment element comprises a blind hole or recess which extends in a radial direction.

* * * * *